(12) United States Patent
Nagata et al.

(10) Patent No.: US 11,845,390 B2
(45) Date of Patent: Dec. 19, 2023

(54) CABIN MONITORING SYSTEM

(71) Applicant: Toyota Motor Engineering & Manufacturing North America, Inc., Plano, TX (US)

(72) Inventors: Katsumi Nagata, Foster City, CA (US); Masashi Nakagawa, Sunnyvale, CA (US); Divya Sai Toopran, Sunnyvale, CA (US); Makoto Tanaka, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/165,251

(22) Filed: Feb. 2, 2021

(65) Prior Publication Data

US 2022/0242352 A1 Aug. 4, 2022

(51) Int. Cl.
*B60R 21/015* (2006.01)
*G08B 21/22* (2006.01)

(52) U.S. Cl.
CPC .. *B60R 21/01534* (2014.10); *B60R 21/01538* (2014.10)

(58) Field of Classification Search
CPC ........ B60R 21/01534; B60R 21/01538; G08B 21/02; G08B 21/0469
See application file for complete search history.

(56) References Cited

U.S. PATENT DOCUMENTS

| | | | | |
|---|---|---|---|---|
| 9,014,920 | B1* | 4/2015 | Torres | B60R 25/10 |
| | | | | 701/45 |
| 9,123,244 | B2* | 9/2015 | Daman | G08G 1/127 |
| 11,093,766 | B1* | 8/2021 | Kale | G06V 10/764 |
| 2012/0050021 | A1* | 3/2012 | Rao | B60R 99/00 |
| | | | | 340/425.5 |
| 2015/0084759 | A1* | 3/2015 | Stefan | B60N 2/26 |
| | | | | 340/438 |
| 2016/0031342 | A1* | 2/2016 | Camello | B60N 2/002 |
| | | | | 701/45 |
| 2016/0249191 | A1* | 8/2016 | Avrahami | H04W 4/12 |
| 2016/0272112 | A1* | 9/2016 | DeGrazia | B60Q 9/00 |
| 2017/0104963 | A1* | 4/2017 | Veneziano | H04N 5/2256 |
| 2017/0240022 | A1* | 8/2017 | Ireri | B60H 1/00778 |
| 2020/0334453 | A1* | 10/2020 | Thomas | B60R 21/01512 |

* cited by examiner

*Primary Examiner* — James A English
(74) *Attorney, Agent, or Firm* — SNELL & WILMER LLP

(57) ABSTRACT

Methods, systems, and apparatus for monitoring a vehicle. The system includes a sensor of the vehicle configured to detect sensor data indicating a presence of an object, occupant, or pet within the vehicle. The system also includes an electronic control unit (ECU) of the vehicle communicatively coupled to the sensor. The ECU is configured to determine whether the object, occupant, or pet is within the vehicle. The ECU is also configured to provide a notification to a user of the vehicle regarding the presence of the object, occupant, or pet within the vehicle.

20 Claims, 10 Drawing Sheets

CABIN MONITORING SYSTEM

BACKGROUND

1. Field

This specification relates to a system and a method for monitoring a cabin of a vehicle.

2. Description of the Related Art

A vehicle may be able to transport occupants as well as cargo of the occupants. A vehicle may include a passenger cabin having seats and seat belts for the occupants to sit in and be secured to the vehicle. In many situations, the occupants may also place objects on various surfaces within the passenger cabin. For example, an occupant may place groceries in the passenger cabin, on a seat or on the ground within the passenger cabin. The occupant may do this if there is not sufficient room in the trunk or cargo storage location, or for purposes of convenience for the occupant. In addition to objects, other living beings, such as pets or small children, may also be located within the passenger cabin. Pets may be secured to a seat using a pet seat belt adapter and pet harness, for example. Small children may be secured in the passenger cabin using an infant car seat or booster seat.

In some situations, due to the potentially small nature of some objects of living beings, they may be inadvertently left in the vehicle after all other occupants have exited the vehicle. Some of these situations may be relatively harmless, such as a beverage being unintentionally left behind in a vehicle, while other situations may be incredibly dangerous, such as leaving a baby or pet in the vehicle. Thus, there is a need for improved monitoring of passenger cabins and corresponding alerting.

SUMMARY

What is described is a system for monitoring a vehicle. The system includes a sensor of the vehicle configured to detect sensor data indicating a presence of an object, occupant, or pet within the vehicle. The system also includes an electronic control unit (ECU) of the vehicle communicatively coupled to the sensor. The ECU is configured to determine whether the object, occupant, or pet is within the vehicle. The ECU is also configured to provide a notification to a user of the vehicle regarding the presence of the object, occupant, or pet within the vehicle.

Also described is a vehicle including a sensor configured to detect sensor data indicating a presence of an object, occupant, or pet. The vehicle also includes an electronic control unit (ECU) communicatively coupled to the sensor. The ECU is configured to determine whether the object, occupant, or pet is within the vehicle. The ECU is also configured to provide a notification to a user regarding the presence of the object, occupant, or pet.

Also described is a method for monitoring a vehicle. The method includes detecting, by a sensor of the vehicle, sensor data indicating a presence of an object, occupant, or pet within the vehicle. The method also includes determining, by an electronic control unit (ECU) of the vehicle, whether the object, occupant, or pet is within the vehicle. The method also includes providing, by the ECU, a notification to a user of the vehicle regarding the presence of the object, occupant, or pet within the vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for detecting objects and living beings in a vehicle, and steps taken in response. The systems, vehicles, and methods disclosed herein automatically detect the presence of an object, occupant, or pet left within a vehicle, and provides an alert to the user of the vehicle. The systems, vehicles, and methods disclosed herein also are capable of adjusting one or more vehicle features in response to the detection of the object, occupant, or pet left within the vehicle. For example, an HVAC (heating, ventilation, and air conditioning) unit may be adjusted, or windows may be opened.

In this way, if the user is not capable of promptly returning to the vehicle, steps may be taken to mitigate a potentially dangerous situation. The systems, vehicles, and methods described herein improve the safety of occupants or pets left within the vehicle, as well as protect the integrity of the vehicle itself, in some situations. If the user is not responsive, the vehicle may take additional steps, such as communicating with third parties, such as emergency responders, to address the situation within the vehicle.

The systems and methods described herein may also alert a user or a vehicle rental company as to objects, occupants, or pets left behind in the vehicle. Using the systems and methods described herein may result in faster detection of missing objects, occupants, or pets, which may be important in time-sensitive situations. The systems and methods described herein may also be used by vehicle rental companies to automatically and objectively assess the state of the passenger cabin from one user to another.

Figure 1:
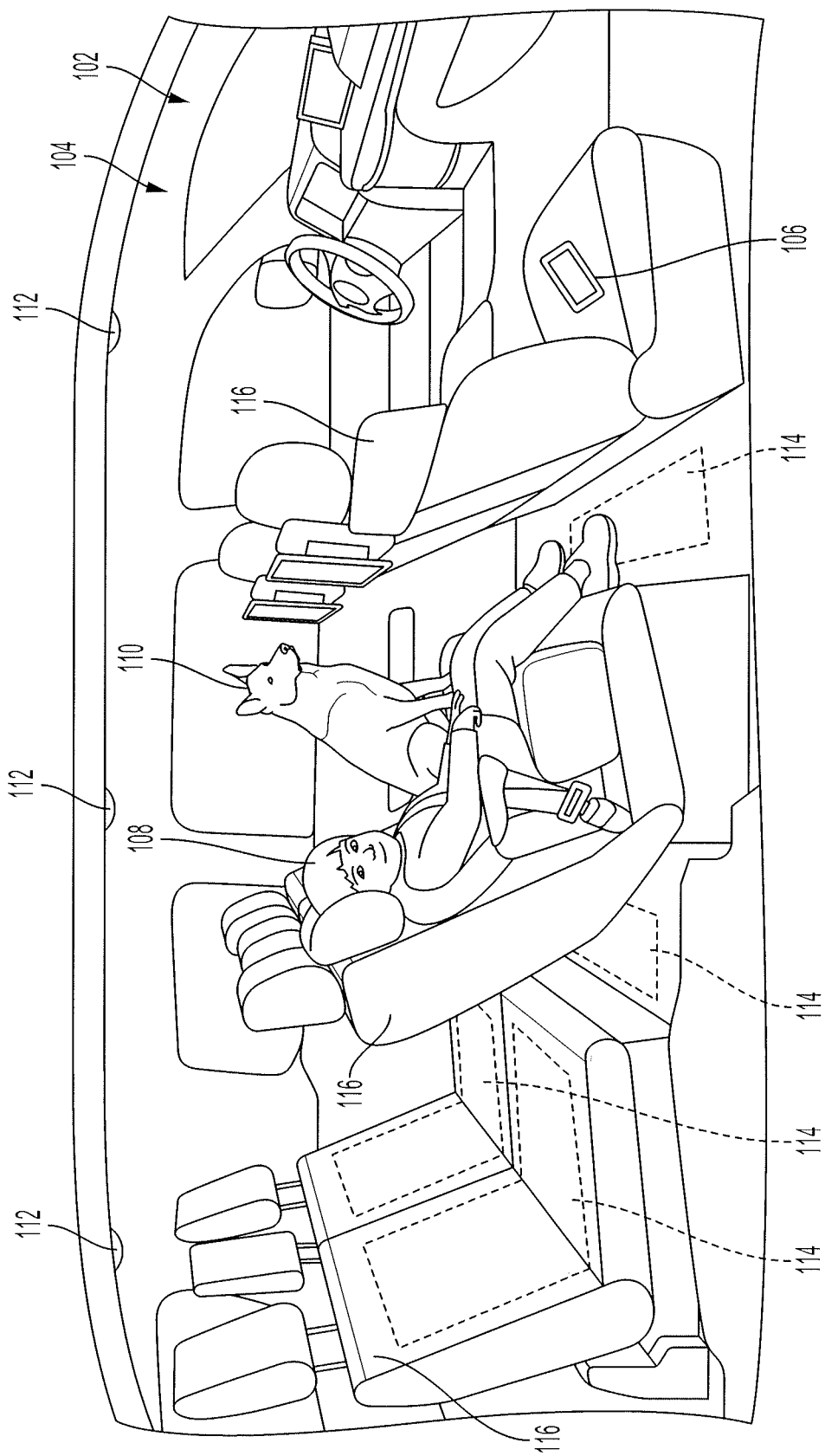
FIG. 1 illustrates a passenger cabin of a vehicle, according to various embodiments of the invention.

FIG. 1 illustrates a vehicle 102 having a passenger cabin 104. The passenger cabin 104 includes multiple rows of seats 116. The seats 116 may be occupied by occupants of the vehicle 102 and/or pets 110. Occupants of the vehicle 102 may include children 108. As described herein, there may be situations where objects (e.g., smartphone 106), occupants (e.g., child 108), or pets (e.g., dog 110) are inadvertently left behind in the passenger cabin 104 of the vehicle 102.

In some situations, the occupants of the vehicle 102 may exit the vehicle 102 and lock the vehicle 102 without remembering that the objects, occupants, or pets were left in the vehicle 102. This may happen as a result of being distracted or limited visibility of the objects, occupants, or pets within the passenger cabin 104 of the vehicle 102.

In the case where an occupant 108 or a pet 110 is left in the vehicle 102, the occupant 108 or pet 110 may be vulnerable. For example, on a hot day, the temperature within a passenger cabin of a vehicle without opened windows could reach a level that is dangerous to an occupant or pet, and in some cases fatal. In another example, on a cold day, the temperature within the passenger cabin of the vehicle without adequate heating could reach a level that is dangerous to an occupant or pet, and in some cases fatal. In addition, in some vehicles, if one or more windows are not opened, there may not be adequate ventilation for the survival of some occupants 108 or pets 110.

In the case where an object is left in the vehicle 102, the separation of the object from the occupant may result in a potentially dangerous situation. For example, if the object is a medical device or medicine that the occupant relies on, the separation of the object from the occupant may cause the occupant to be in medical risk.

In less life-threatening situations, an object left behind in a vehicle may cause problems in the near or long term. For example, a smartphone or laptop that is left behind may render its owner to be in an unreachable state. In addition, if the smartphone or laptop is in plain view, a thief may break a window of the vehicle to steal the smartphone or laptop. In another example, an item from a grocery bag may roll out of the grocery bag and be left behind in the vehicle. If the item is a perishable one, such as raw chicken, and it is left in the vehicle for an extended period of time, many extensive efforts may be required to remove the smell of the item from the vehicle. In yet another example, when the vehicle is a rental vehicle that is being returned, any objects left behind may not be retrieved by the owner for a long period of time, if ever. This may be particularly worsened if the owner returns the rental vehicle and immediately proceeds to board an airplane and lives far away.

Within the passenger cabin 104 are one or more sensors 112 configured to detect sensor data within the passenger cabin 104. The sensors 112 may be image sensors (e.g., cameras) configured to detect image data, spatial sensors (e.g., RADAR, LASER, or LIDAR, etc.) configured to detect spatial data, localization sensors (e.g., BLE, UWB, etc.) configured to detect localization data, infrared sensors configured to detect infrared data or heat data, and/or or temperature sensors configured to detect temperature data. While the sensors 112 are shown as being on the ceiling of the passenger cabin 104 of the vehicle 102, the sensors 112 may be in any location within the passenger cabin 104. In some embodiments, there may be sensors 112 outside of the passenger cabin on an exterior of the vehicle 102 for detecting sensor data outside of the vehicle 102. The sensors 112 may have automatic adjustment functionality to change settings of the sensor to improve the sensing capabilities. For example, the image sensors may include auto-focusing functionality or zooming functionality, the spatial sensors may include a RADAR signal strength functionality or a LASER scanning range functionality. The intelligence of the detection/identification using the sensors 112 may be built-in within the sensors 112 or an external ECU 403 as later explained.

In addition to the sensors 112, there may also be weight sensors 114 within the vehicle 102. The weight sensors 114 may be located in the seats 116 and/or within the floors of the vehicle 102. The weight sensors are configured to detect weight data.

The sensor data may be analyzed by a computer processor of the vehicle (e.g., ECU) or a computer processor of a remote data server to automatically determine whether objects, occupants, or pets have been left behind in the vehicle 102.

The sensor data may be analyzed by comparing the sensor data over time to detect when objects, occupants, or pets have entered the vehicle 102, and also to determine whether they have exited the vehicle 102. The sensor data may also be analyzed over time after the vehicle 102 has been locked to detect movement within the passenger cabin 104 of the vehicle 102. The sensor data may also be analyzed using machine learning or artificial intelligence techniques to identify objects, occupants, or pets within the vehicle as well as on an exterior of the vehicle 102 at any given time. Training data may be used in conjunction with the machine learning or artificial intelligence techniques for the computing systems to learn to identify objects, occupants, or pets with higher accuracy.

Within the passenger cabin 104 may also be one or more lights configured to provide light to improve clarity of image data detected by the image sensors. In some embodiments, the image sensor is capable of night vision with infrared lighting and other lighting sources. The sensor 112 may include cameras capable of capturing images in dark lighting conditions, such as a thermal imaging camera or infrared camera, for example.

In some embodiments, the vehicle may also include an odor sensor configured to detect particular odors within the vehicle. For example, the odor sensor may be configured to detect spoiled food products, and the odor data from the odor sensor may be used to alert to the user that food may have been inadvertently left behind. The odor sensor may be much more sensitive than the human nose, which may assist in preventing unfavorable situations.

Figure 2:
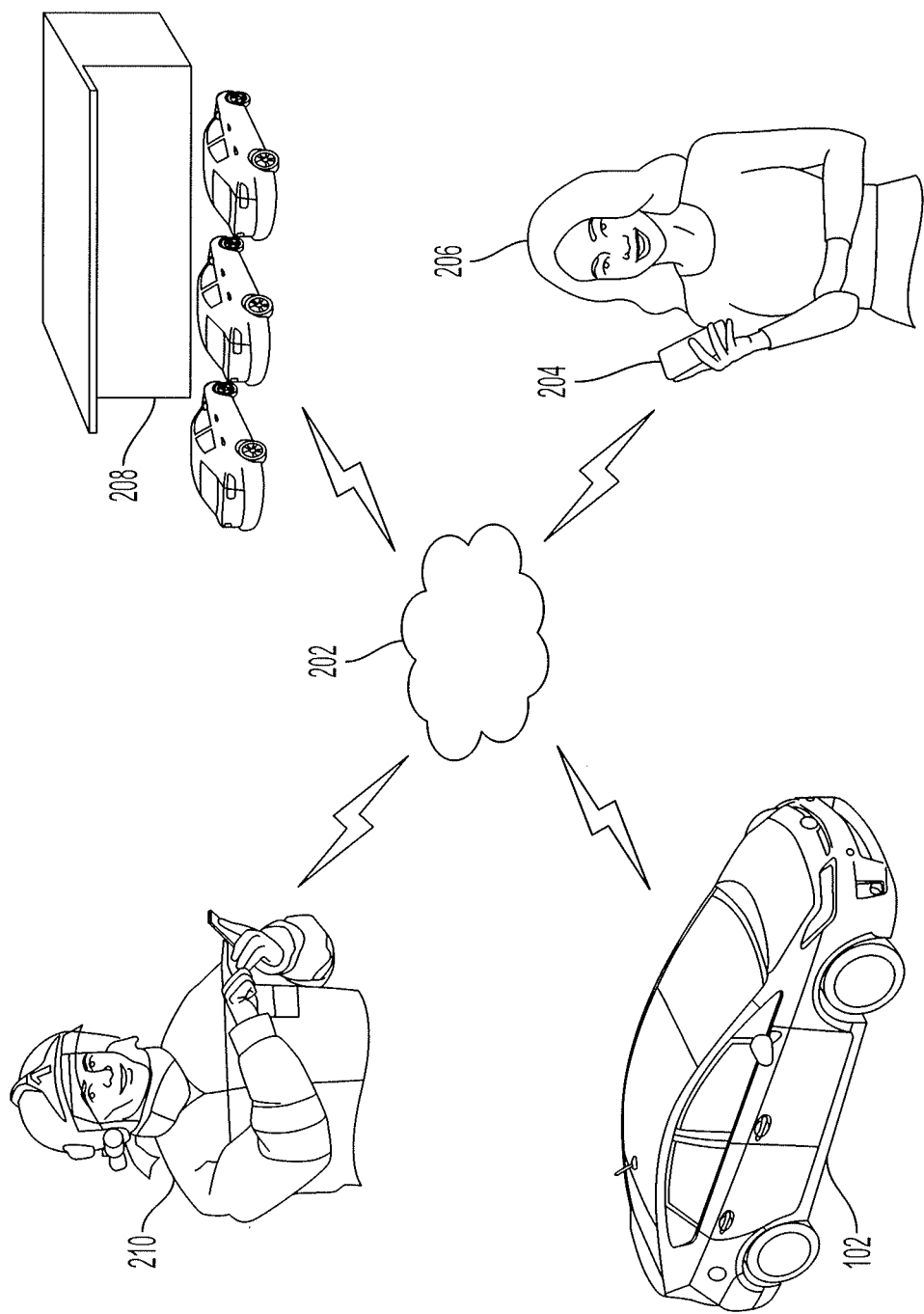
FIG. 2 illustrates the vehicle communicating with devices and entities, according to various embodiments of the invention.

FIG. 2 illustrates a system of communication with the vehicle 102. The vehicle 102 may include a transceiver for communicating with one or more other computing devices via a network 202 (e.g., the Internet).

The vehicle 102 may communicate with a mobile device 204 of a user 206 of the vehicle. The user 206 of the vehicle 102 may be any individual who is associated with the vehicle 102, such as an owner of the vehicle or a recognized driver or occupant of the vehicle. The mobile device 204 of the user 206 may be registered and associated with the vehicle 102 for allowing communications between the mobile device 204 and the vehicle 102. The mobile device 204 may be any device with a processor, a memory, an input device (e.g., touchscreen, mouse, keyboard, stylus), an output device (e.g., display screen, touchscreen), and a transceiver for communicating and receiving data.

For example, after the vehicle 102 detects that an object, occupant, or pet is located in the vehicle, a warning communication may be provided to the user 206 of the vehicle. The warning communication may be an audible alert or visual alert from the vehicle 102 to catch the attention of the user as the user exits the vehicle. The warning communication may be sent via the mobile device 204. The warning communication may include a general notification that an object, occupant, or pet is in the vehicle 102. The warning communication may, more specifically, include an identification of the object (e.g., smartphone), occupant (e.g., child), or pet (e.g., dog) that is detected as being within the vehicle 102. The mobile device 204 may include a processor configured to render a graphical user interface providing the notification and providing particular actions for the user 206 to take.

The vehicle 102 may also communicate with a vehicle rental company 208 when the vehicle 102 is a rental vehicle.

The vehicle 102 may automatically detect an object, occupant, or pet, and the vehicle 102 may communicate corresponding data to a computing device of the vehicle rental company 208. The vehicle rental company may then notify the registered renter of the vehicle 102 that the object, occupant, or pet was detected in the vehicle 102. This may be useful in situations where the renter of the vehicle 102 has returned the vehicle 102 to the vehicle rental company and is on their way to board a plane, for example. Using the automatic detection from the vehicle 102 may be faster than a human employee of the rental company inspecting the vehicle 102 after it has been returned and then referencing the rental company's records to obtain the contact information of the renter.

The vehicle rental company may also use the sensors of the vehicle 102 to automatically and objectively determine a state of the passenger cabin of the vehicle 102 before and after the renter's use of the vehicle 102 for any damage or misuse by the renter. This may aid the rental company in being able to share objective evidence of damage and/or misuse by the renter and determining whether extra charges are appropriate for the renter, and how much the extra charges should be, if the vehicle 102 was returned in an excessively poor state.

The vehicle 102 may also communicate with an emergency responder 210 when the user 206 of the vehicle cannot be reached and there is an emergency situation with the vehicle 102. The emergency situation may be an occupant or a pet being left in the vehicle 102 and conditions that may jeopardize the occupant or pet's well-being. The vehicle 102 may provide a computing device associated with the emergency responder 210 information associated with the occupant or pet, including a time that the occupant or pet has been left inside the vehicle, temperature data within the vehicle, and the location of the occupant or pet, for example. This information may be useful for the emergency responder 210 when the emergency responder 210 arrives at the vehicle 102 to render aid.

Figure 3B:
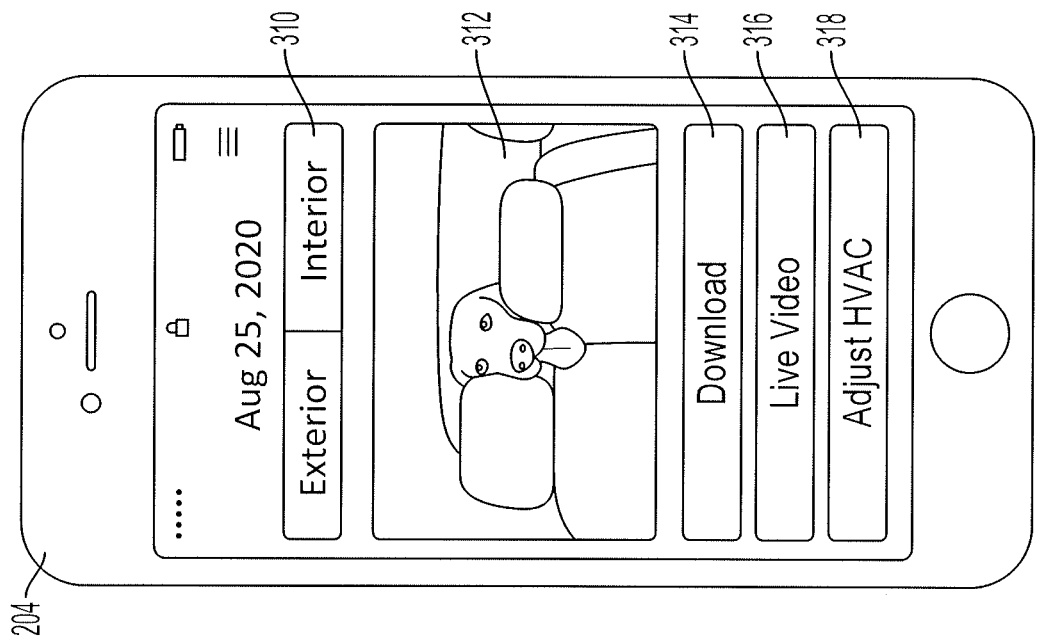
FIG. 3A-3G illustrate actions taken in response to detection of a dog or child in the vehicle, according to various embodiments of the invention.
Figure 3A:
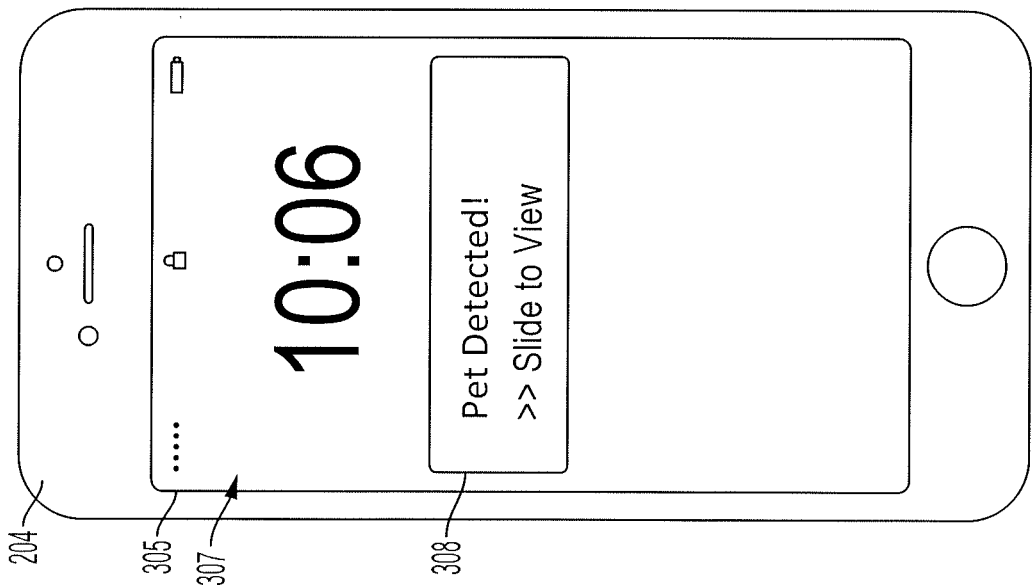

FIG. 3A illustrates a mobile device 204 with a display screen 305 for presenting a graphical user interface 307. One or more processors of the mobile device 204 may render the graphical user interface 307 that is displayed on a display screen 305 of the mobile device 204. As shown, the graphical user interface 307 is displaying a lock screen, whereby engagement with the mobile device 204 is limited. The graphical user interface 307 includes an icon 308 that notifies the user that a pet is detected in the vehicle. The icon 308, when engaged, provides additional options for the user. Engagement of the icon 308 may also unlock the mobile device 204 or prompt the user to provide authentication (e.g., fingerprint, facial recognition, password, passcode, or pattern) for unlocking the mobile device 204 to enable full functionality. In some embodiments, engaging the icon 308 allows for limited use of the mobile device capabilities without providing authentication.

As shown, the icon 308 specifies that a pet is detected in the vehicle. In other embodiments, the information may be more or less specific. For example, in some embodiments, the icon 308 may indicate that an object, occupant, or pet was detected in the vehicle, and the user may investigate further using the full functionality of the mobile device 204. In other embodiments, the icon 308 may be more specific if the specific object, occupant, or pet is able to be identified. The icon 308 may indicate that "Sammie is detected as being in the vehicle" or "Your luggage is detected as being in the vehicle."

FIG. 3B illustrates a graphical user interface rendered by the mobile device 204. The graphical user interface includes an icon 310 for toggling between interior and exterior views of the passenger cabin 104. The graphical user interface also includes an image 312 rendered based on image data of a detected object, occupant, or pet. The image data is detected by one or more image sensors of the vehicle 102 and provided to the mobile device 204. The image 312 may be a still image or a video. The image 312 may be provided in real-time or may be a record of a previous image. The graphical user interface may also include an icon 314 to download the image 312 to local storage of the mobile device 204. The image 312 may be downloaded from the vehicle 102 and/or a remote data server.

In some embodiments, the image may be an interactive image, where the image is a three-dimensional rendering of the interior of the vehicle 102 and the user is able to manipulate the perspective within the interactive image (e.g., pan, tilt, zoom, rotate). The three-dimensional rendering may be created by the vehicle 102 and/or a remote data server using multiple sensors within the vehicle 102.

The graphical user interface may also include an icon 316 for obtaining live video from one or more image sensors within the vehicle. When the icon 316 is engaged or pressed, the mobile device 204 transmits a request to the vehicle 102 and/or a remote data server for live video of the passenger cabin of the vehicle 102. When the vehicle 102 receives the request, the vehicle 102 transmits live video to the mobile device 204, either directly or via one or more remote data servers. The live video may be shown in the image 312 location, or a separate window may be provided for the live video.

By being able to view the live video from image sensors within the vehicle, the user is able to visually confirm a notification of an object, occupant, or pet being detected. The live video may be saved to a memory (local to the mobile device 204, the vehicle 102 and/or a remote memory) for later viewing.

The graphical user interface may also include an icon 318 for adjusting HVAC settings of the vehicle 102, to provide heating or cooling or air circulation to the passenger cabin of the vehicle. Being able to provide heating or cooling or air circulation to the passenger cabin of the vehicle may be very important to ensuring the health and well-being of living beings within the vehicle 102. The adjustment of the HVAC settings may include, for example, a fan speed, a temperature setting, and an air vent setting (e.g., orientation and/or opening setting).

In some embodiments, other aspects of the vehicle 102 may be capable of being controlled by the user via the mobile device 204 including, but not limited to, door locks (e.g., locked or unlocked), window opening and closing, and vehicle ignition.

Figure 3C:
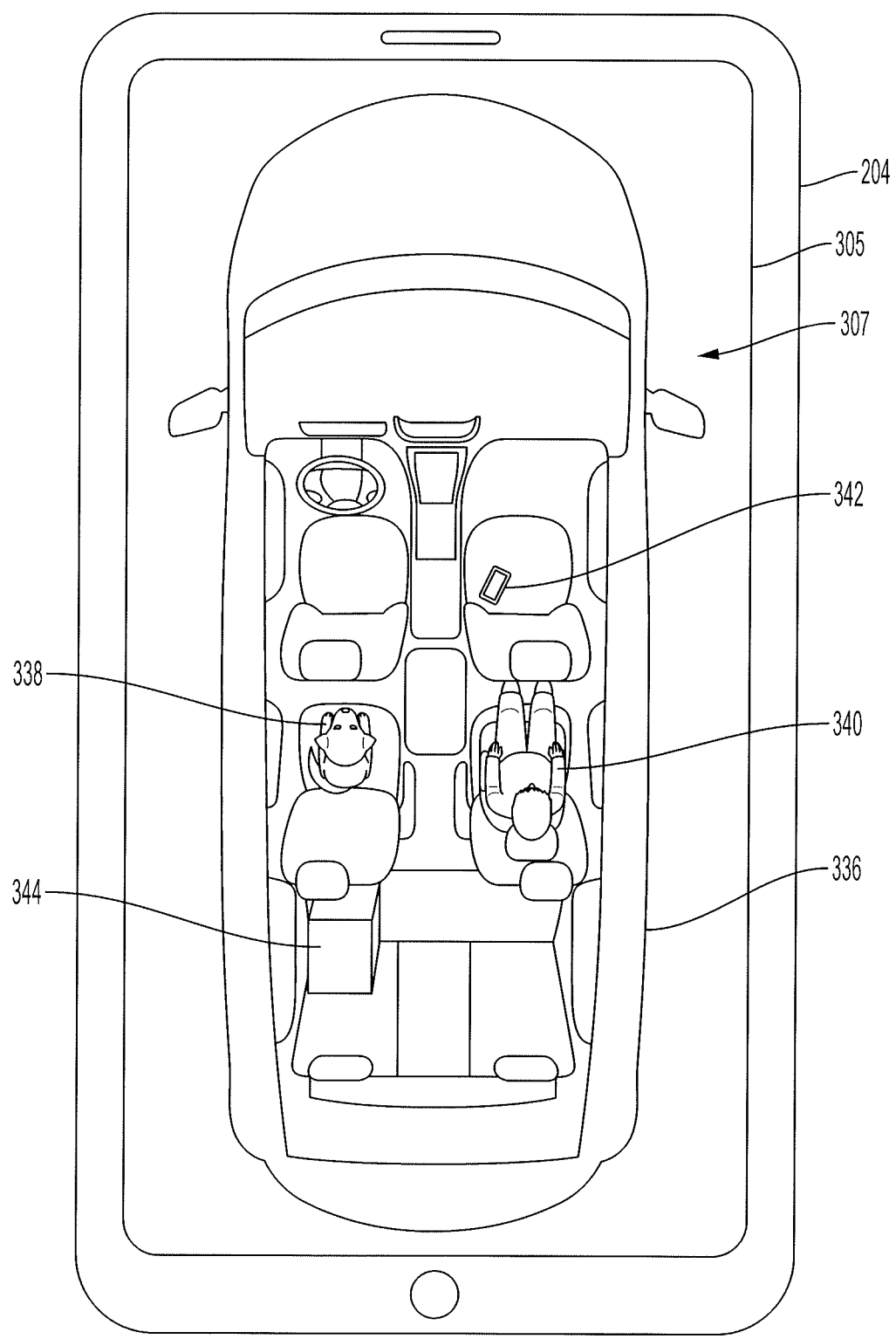

The location of the objects, occupants, or pets may also be provided to the user via the mobile device. As shown in FIG. 3C, a graphical user interface 307 of the mobile device may include an outline 336 of the passenger cabin 104 of the vehicle 102. The graphical user interface 307 may include one or more icons 338, 340, 342, 344 each associated with an object, occupant, or pet in the passenger cabin 104 of the vehicle 102.

For example, an icon 338 of a dog may be used to show the presence of a dog within the passenger cabin 104. The icon 338 may be located in the outline 336 of the passenger cabin 104 at a location corresponding to the location of the actual detected dog within the vehicle 102. An icon 340 of a child may be used to show the presence of a child within the passenger cabin 104. The icon 340 may be located in the outline 336 of the passenger cabin 104 at a location corresponding to the location of the actual detected child within the vehicle 102. An icon 342 of a smartphone may be used to show the presence of a smartphone within the passenger cabin 104. The icon 342 may be located in the outline 336 of the passenger cabin 104 at a location corresponding to the location of the actual detected smartphone within the vehicle 102. An icon 344 of luggage may be used to show the presence of luggage within the passenger cabin 104. The icon 344 may be located in the outline 336 of the passenger cabin 104 at a location corresponding to the location of the actual detected luggage within the vehicle 102. If the detected objects, occupants, or pets move within the passenger cabin 104, the location of the corresponding icon may be updated within the outline 336 of the passenger cabin 104 on the graphical user interface 307.

The icons 338, 340, 342, 344 may be cartoon-like icons that represent various objects, occupants, or pets. That is, the same icon may be used for any detected pet, regardless of animal species. Alternatively, the icons 338, 340, 342, 344 may be generated based on image data from image sensors within the vehicle and may be more realistic representations of the objects, occupants, or pets than cartoon-like icons. In some situations, a cartoon-like icon may be used temporarily until a clear image of the detected object, occupant, or pet is captured, and once the clear image is captured, a more realistic representation of the object, occupant, or pet is used.

Figure 3D:
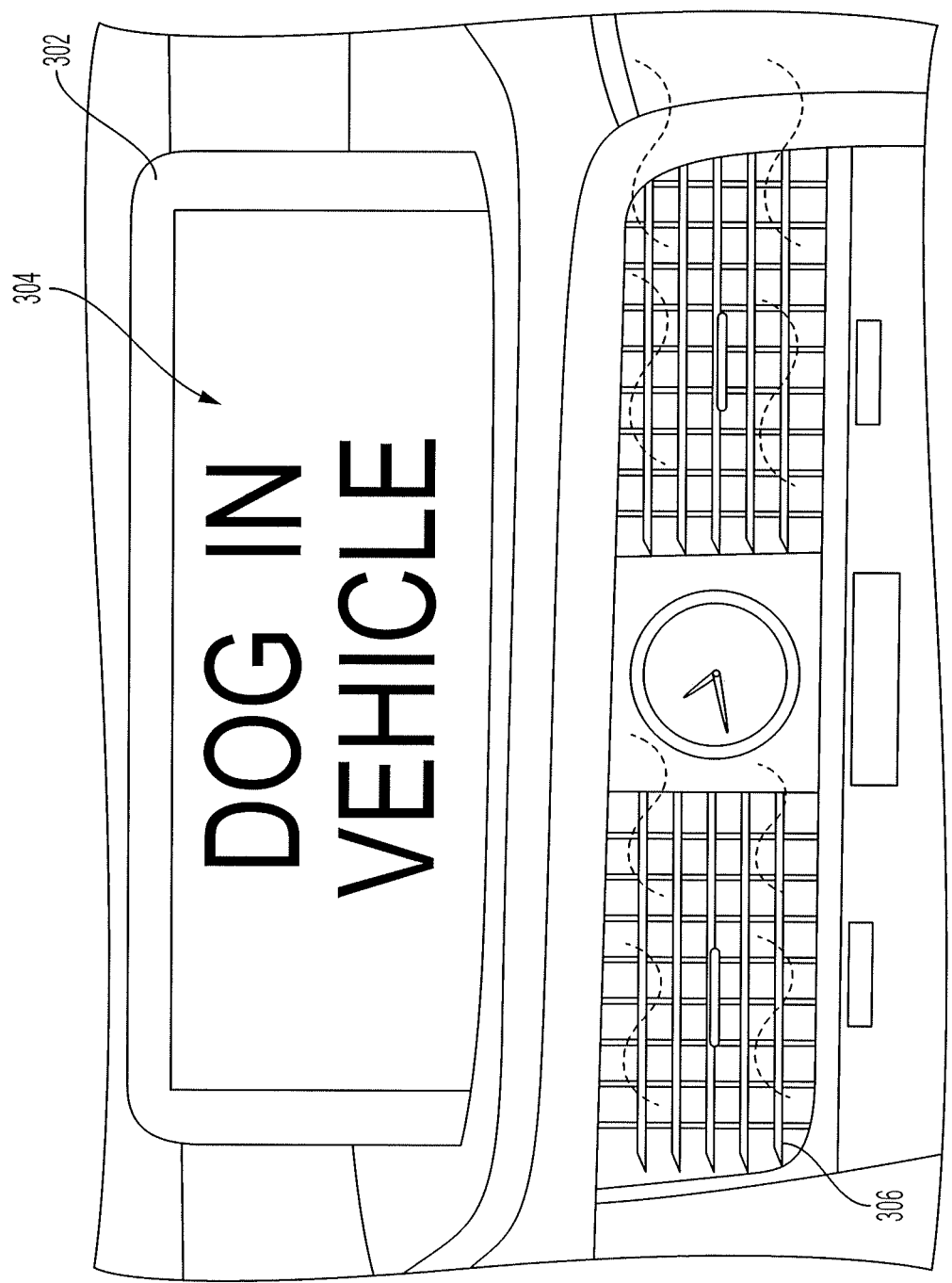

FIG. 3D illustrates an infotainment unit 302 of the vehicle 102. The infotainment unit 302 includes a display screen configured to display the graphical user interface 304. The graphical user interface 304 may show a message regarding the presence of an object, occupant, or pet in the vehicle 102. As shown, the message indicates that there is a dog in the vehicle. The message may be shown in any display of the vehicle 102 or projected onto a surface of the vehicle 102 (e.g., window, side mirror, pillar, etc.).

The message may be shown when the vehicle 102 is turned off, as a reminder to the occupants as they exit the vehicle 102. The vehicle 102 may use its sensors to detect the presence of the object, occupant, or pet and alert the occupants as they leave the vehicle 102. The message may also be shown after a user of the vehicle 102 is aware that a living being, such as a child or a pet is in the vehicle, and the message may be displayed to indicate to others outside of the vehicle that the user of the vehicle is aware of the child or pet in the vehicle 102. In some situations, if a passerby notices a child or pet in the vehicle, the passerby may assume that the child or pet was left there unintentionally, and the passerby may break a window of the vehicle to rescue the child or pet. The message may serve to assuage the passerby that the child or pet is being taken care of and intervention may not be necessary.

One such way that the child or pet can be taken care of is by providing cooling or heating from air vents 306 of the vehicle 102. An HVAC unit of the vehicle 102 may be remotely controlled by the user, as described herein, and the HVAC unit may provide heating or cooling via the air vents 306. In some embodiments, based on the temperature within the vehicle and/or the temperature outside of the vehicle, the HVAC unit may be automatically turned on to provide heating or cooling when an occupant or pet is detected as being inside of the vehicle. For example, if a temperature sensor detects that the temperature within the vehicle exceeds a threshold temperature, the HVAC unit may automatically be activated to provide cooling, and if the temperature sensor detects that the temperature within the vehicle is lower than another threshold temperature, the HVAC unit may automatically be activated to provide heating. In some embodiments, additional sensor data may also be considered, such as humidity, outside temperature, and/or precipitation. A notification may be sent to the user 206 if the vehicle 102 automatically activates a feature along with an identification of the feature that was automatically activated.

Figure 3E:
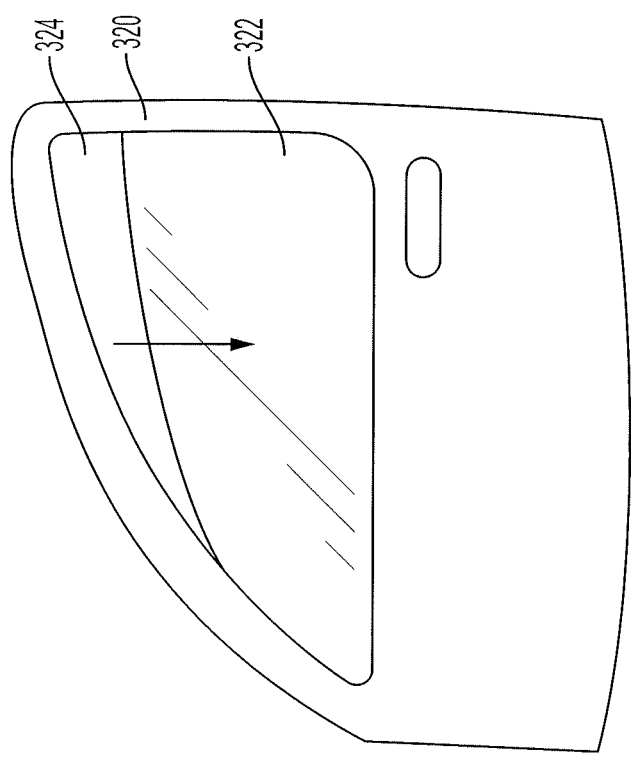

FIG. 3E illustrates a door 320 of the vehicle 102 having a window 322 which may be lowered to open a gap 324 to promote airflow within the vehicle 102. The window 322 may be lowered based on an indication from the user (e.g., via a mobile device). In addition to the window, a sunroof or any other opening of the vehicle may also be controlled in the same manner as the window 322. For example, the user may provide an indication to the mobile device of an amount that the window 322 should be opened or a height of the gap 324. The mobile device may communicate an instruction to the vehicle, and the vehicle may adjust the window 322 according to the instruction from the user.

The window 322 may also be automatically lowered by the vehicle. In some embodiments, the window 322 may automatically be opened when an occupant or pet is detected as being inside of the vehicle. For example, if a temperature sensor detects that the temperature within the vehicle exceeds a threshold temperature, the window 322 may automatically be opened to provide cooling. In some embodiments, additional sensor data may also be considered, such as humidity, outside temperature, and/or precipitation. When the vehicle 102 detects precipitation, the window 322 may automatically be closed and the HVAC unit may be automatically activated if needed. A notification may be sent to the user 206 if the vehicle 102 automatically activates a feature along with an identification of the feature that was automatically activated.

Figure 3F:
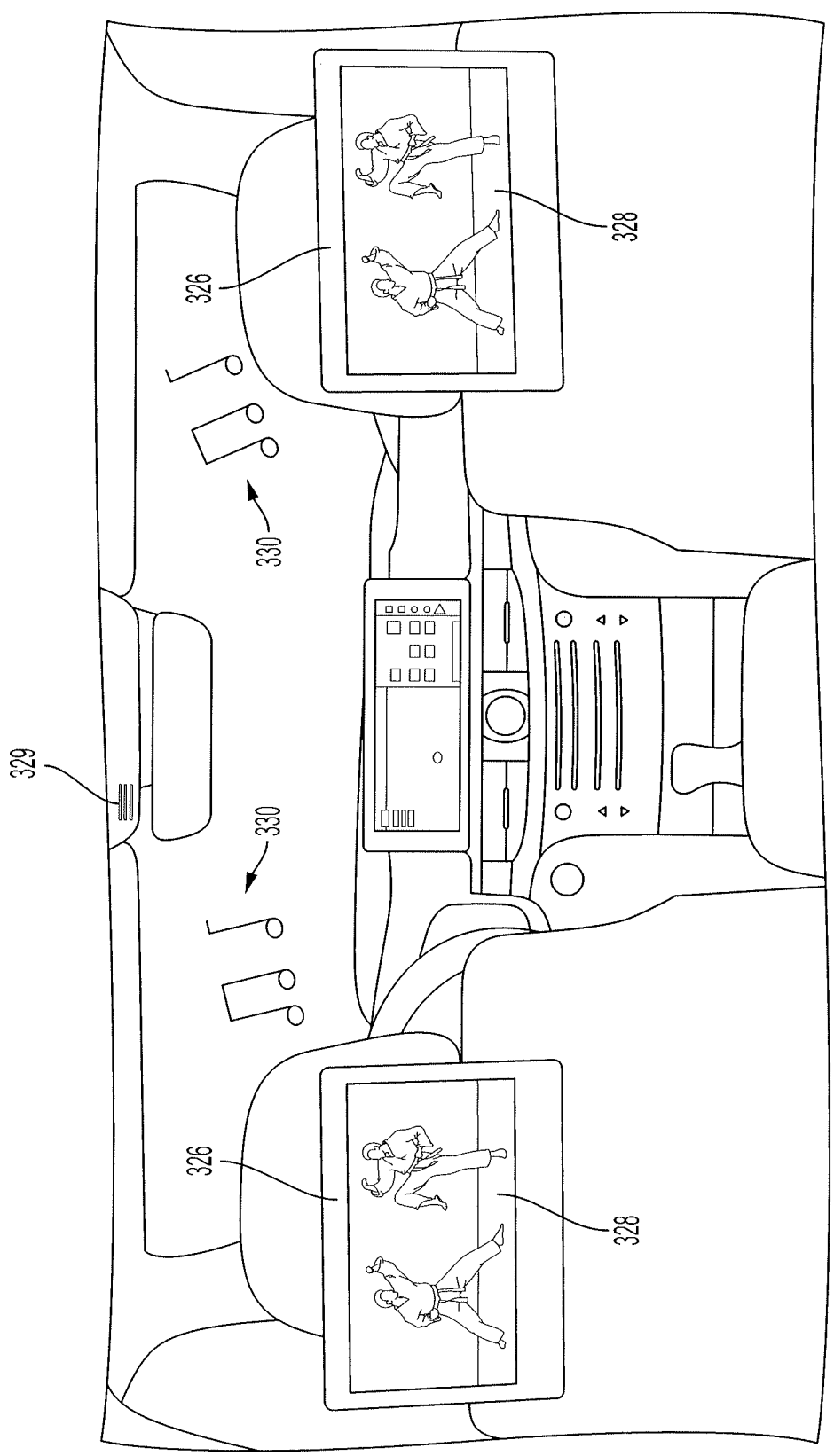

FIG. 3F illustrates a rear entertainment system having display screens 326 for displaying entertainment content 328. In some situations, as a way to calm or assuage children or pets left behind in the vehicle, the rear entertainment system may provide entertainment content 328 via the display screens 326 and/or speakers for providing audio entertainment 330. The speakers may also be used to project audio data received via the mobile device of the user. The user may speak into a microphone of the mobile device, and the spoken sounds will be played by the speakers of the vehicle for the children or pets to hear. A microphone 329 in the vehicle may be turned on to provide two-way communication between the user (using the mobile device) and the occupants or pets in the vehicle.

Figure 3G:
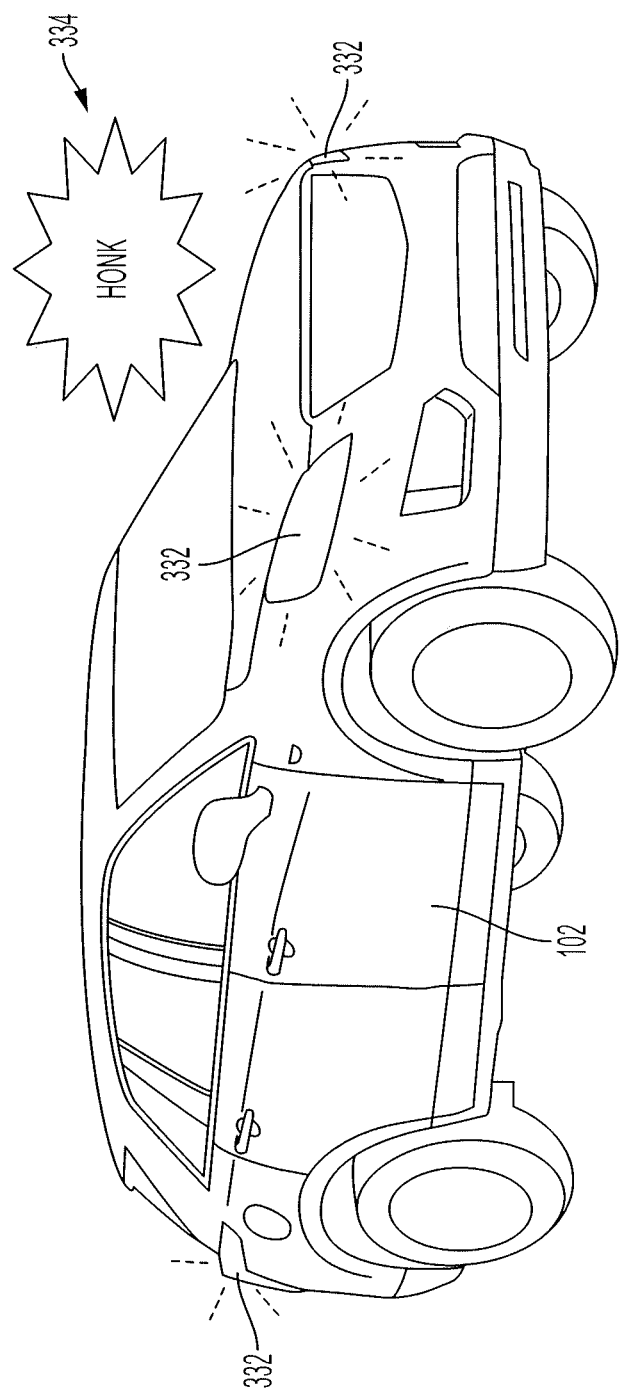

FIG. 3G illustrates the vehicle 102 providing an emergency signal using a horn 334 and/or lights 332. The horn 334 and/or lights 332 may be used to catch the attention of those exiting the vehicle 102, to alert them to the detection of an object, occupant, or pet left behind in the vehicle 102.

In some situations where the user is not responsive or other third parties are not responsive, and an emergency situation is detected, the vehicle 102 may provide the emergency signal using the horn 334 to produce sounds and/or the lights 332 to produce noise, to attract the attention of passersby. In some embodiments, this may be a measure of last resort. The emergency signal using the horn 334 to produce sounds and/or the lights 332 to produce noise may also attract the attention of emergency responders, if they have been summoned, as described herein.

While actions are described as being taken by the user 206, in many embodiments, if the user 206 is not responsive, the actions described herein may be taken by any third party, such as the vehicle manufacturer providing monitoring service, an emergency responder, or a vehicle rental company. In addition, the vehicle 102 may be capable of automatically performing any of the actions described herein when sensor data exceeds corresponding thresholds.

Figure 4:
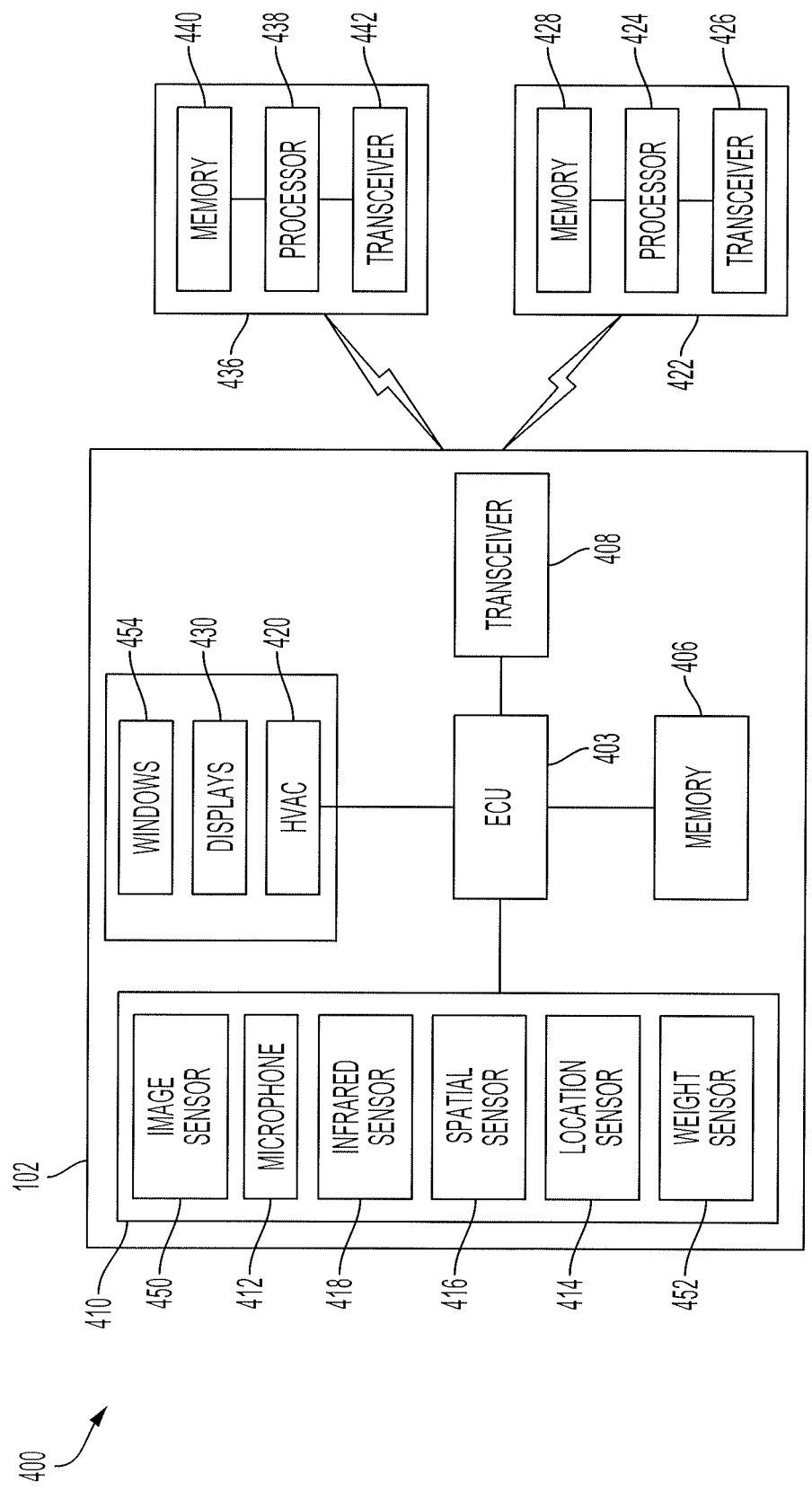
FIG. 4 is a block diagram of the system, according to various embodiments of the invention.

FIG. 4 illustrates an example system 400, according to various embodiments of the invention. The system may include a vehicle 102. The vehicle 102 may have an automatic or manual transmission. The vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor or battery driven vehicle. For example, the vehicle 102 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may use one or more sensors and/or a navigation unit to drive autonomously.

The vehicle 102 also includes one or more computers or electronic control units (ECUs) 403, appropriately programmed, to control one or more operations of the vehicle 102. The one or more ECUs 403 may be implemented as a single ECU or in multiple ECUs. The ECU 403 may be electrically coupled to some or all of the components of the vehicle 102. In some embodiments, the ECU 403 is a central ECU configured to control one or more operations of the entire vehicle. In some embodiments, the ECU 403 is multiple ECUs located within the vehicle and each configured to control one or more local operations of the vehicle. In some embodiments, the ECU 403 is one or more computer processors or controllers configured to execute instructions stored in a non-transitory memory 406.

Although FIG. 4 illustrates various elements connected to the ECU 403, the elements of the vehicle 102 may be connected to each other using a communications bus.

The vehicle 102 may be coupled to a network, as shown in FIG. 2, via a transceiver 408. The network, such as a local area network (LAN), a wide area network (WAN), a cellular network, a digital short-range communication (DSRC), the Internet, or a combination thereof, connects the vehicle 102 to a remote data server 436 and/or a mobile device 422.

The transceiver 408 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 408 may transmit data to and receive data from devices and systems not directly connected to the vehicle. For example, the ECU 403 may communicate with a remote data server 436 and/or a mobile device 422. Furthermore, the transceiver 408 may access the network (e.g., network 202), to which the remote data server 436 and the mobile device 422 is also connected.

The vehicle 102 includes a sensor array 410 connected to the ECU. The sensor array may include one or more image sensors 450, one or more microphones 412, one or more infrared sensors 418, one or more spatial sensors 416, one or more location sensors 414, and one or more weight sensors 452, each as described herein.

The image sensors 450 are configured to detect image data within the passenger cabin 104 of the vehicle 102 and used to determine whether an object, occupant, or pet was left behind. The image sensors 450 may also be configured to detect image data outside of the vehicle 102 to determine whether the user had walked away from the vehicle without removing any object, occupant, or pet from the vehicle 102.

The image data may be communicated to the ECU 403, and the ECU 403 may detect whether an object, occupant, or pet has been left behind in the vehicle, as described herein. The image data may also be communicated to the remote data server 436 and/or the mobile device 422, as described herein. In addition, the image sensors 450 themselves may be capable of detection of the image data as well as the detection of whether an object, occupant, or pet has been left behind in the vehicle and/or identification of the object, occupant, or pet. In this regard, the image sensors 450 may use artificial intelligence or machine learning techniques, as described herein, for detecting and/or identifying the object, occupant, or pet in the vehicle 102.

The microphones 412 are configured to detect audio data from within the passenger cabin 104 of the vehicle 102. The audio data may be communicated to the ECU 403, and the ECU 403 may detect whether an object, occupant, or pet has been left behind in the vehicle. For example, the audio data may reflect a ringtone from a mobile device left in the vehicle, the cries of a baby left in the vehicle, or the barking of a dog left in the vehicle, for example.

The infrared sensors 418 are configured to detect infrared data from within the passenger cabin 104 of the vehicle 102. The infrared data may include temperature or heat data indicating the presence of a living being within the passenger cabin. The infrared data may be communicated to the ECU 403, and the ECU 403 may detect whether an occupant or pet has been left behind in the vehicle. For example, the infrared data may show a heat signature corresponding to that of a human or dog, for example.

The spatial sensors 416 are configured to detect spatial data from within the passenger cabin 104 of the vehicle 102. The spatial sensors 416 may be LIDAR or RADAR, for example. The spatial data may be communicated to the ECU 403, and the ECU 403 may detect whether an occupant or pet has been left behind in the vehicle. For example, the spatial data may show movement within the vehicle indicating the presence of a living being. In another example, sensors such as RADAR, LIDAR, and UWB may be used to detect heart rates and/or respiratory rates of any living beings within the vehicle 102.

The location sensor 414 is configured to determine location data. The location sensor 414 may be a GPS unit or any other device for determining the location of the vehicle 102. The ECU 403 may use the location data along with the map data to determine a location of the vehicle. In other embodiments, the location sensor 414 has access to the map data and may determine the location of the vehicle and provide the location of the vehicle to the ECU 403.

The weight sensors 452 (e.g., weight sensors 114) are configured to detect weight data. The weight sensors 452 may be located on seats or in the floor or in the trunk of the vehicle 102. The weight data may be communicated to the ECU 403, and the ECU 403 may detect whether an object, occupant, or pet has been left behind in the vehicle. For example, the weight data may show movement within the vehicle indicating the presence of a living being. The weight data may also show the presence of an object within the vehicle 102 when no objects are expected to be in the vehicle 102.

The memory 406 is connected to the ECU 403 and may be connected to any other component of the vehicle. The memory 406 is configured to store any data described herein, such as the map data, the location data, the image data, the audio data, infrared data, spatial data, weight data, and any data received from the remote data server 436 and/or mobile device 422 via the transceiver 408.

The vehicle 102 also includes vehicle devices, such as HVAC 420, displays 430 (e.g., display 302, 326), and windows 454 (e.g., windows 322). The ECU 403 may provide instructions to each vehicle device for controlling the respective vehicle device. The ECU 403 may instruct the HVAC 420 to emit cold air, warm air, or provide fresh air from outside of the vehicle into the vehicle. The ECU 403 may instruct the displays 430 to display entertainment content or display messages. The ECU 403 may instruct the windows 454 to roll down or up.

The remote data server 436 may include a non-transitory memory 440, a processor 438 configured to execute instructions stored in the non-transitory memory 440, and a transceiver 442 configured to transmit and receive data to and from other devices, such as vehicle 102. The remote data server 436 may be one or more servers from different service providers. Each of the one or more servers may be connected to one or more databases. A service provider may provide data to the vehicle, such as navigational map, weather and/or traffic data, for example.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name. The information may also include the image data and/or audio data from the ECU 403 that will be used to train the AI model to improve detection and/or identification of the object. The training of the AI model may be performed by any computing device described herein, such as the ECU 403, the processor 438 of the remote data server 436, or the processor 424 of the mobile device 422, for example.

The remote data server 436 may be associated with a third party, such as an emergency responder or a vehicle rental company. As described herein, the vehicle 102 may communicate with the remote data server 436 of a third party in certain situations. For example, the vehicle 102 may communicate with an emergency responder when an occupant or pet is detected in the vehicle 102 and the user is not responsive. In another example, the vehicle 102 may communicate with a vehicle rental company when the vehicle 102 detects an object, occupant, or pet being left behind in the vehicle 102, which may be particularly useful after the user has returned the vehicle to the vehicle rental company.

Also included in the system is a mobile device 422 (e.g., mobile device 204), which includes a processor 424 configured to execute instructions stored in non-transitory memory 428. The mobile device 422 also includes a transceiver 426 similar to transceiver 408 and transceiver 442. The mobile device 422 also includes an input/output device configured to receive inputs from the user and display outputs to the user, as described herein. The input/output device may be an input device (or input unit) such as a touchscreen, a microphone, a stylus, or a keyboard and an output device (or output unit) such as a touchscreen, a display screen, or a speaker.

As described herein, the mobile device 422 may be used to provide notifications and image data to the user about detected objects, occupants, or pets in the vehicle 102. The mobile device 422 may also be used to provide instructions to the ECU 403 of the vehicle 102 for controlling one or more vehicle devices, such as HVAC 420, displays 430, or windows 454, for example. The mobile device 422 may receive the live video from the ECU 403 directly or indirectly over the network (e.g., network 202).

As used herein, a "unit" may refer to hardware components, such as one or more computer processors, controllers, or computing devices configured to execute instructions stored in a non-transitory memory.

Figure 5:
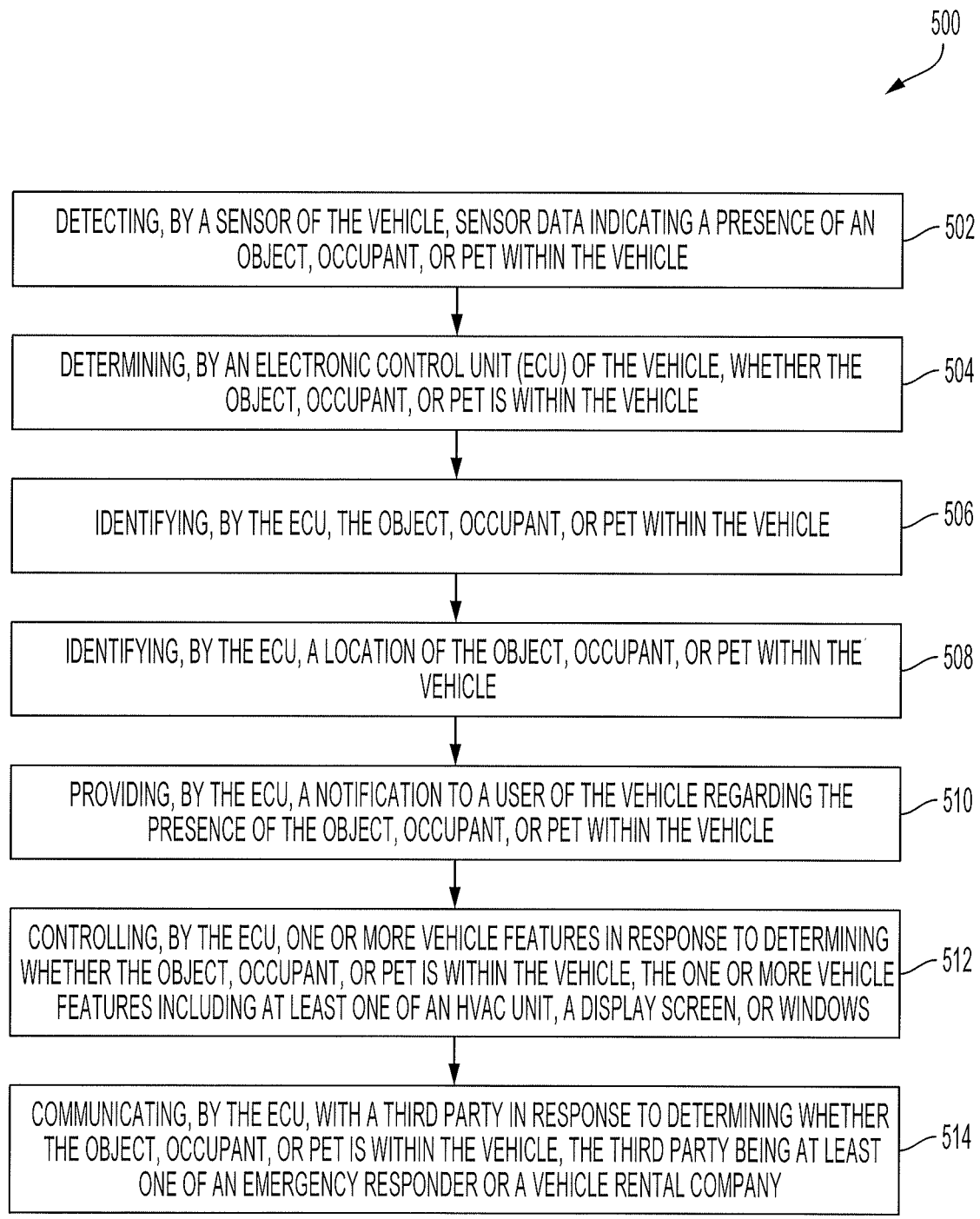
FIG. 5 is a flow diagram of a process performed by the system, according to various embodiments of the invention.

FIG. 5 illustrates a flowchart of a process 500 performed by the systems described herein. A sensor (e.g., image sensor 450, microphone 412, infrared sensor 418, spatial sensor 416, weight sensor 452) detects sensor data indicating the presence of an object, occupant, or pet within the vehicle (step 502). The sensor may be located within the vehicle (e.g., vehicle 102) or may be outside of the vehicle. A plurality of sensors may each detect respective sensor data.

An electronic control unit (ECU) (e.g., ECU 403) of the vehicle determines whether the object, occupant, or pet is within the vehicle (step 504). The ECU may be communicatively coupled to one or more sensors. The ECU may use machine learning techniques and/or artificial intelligence to determine whether the object, occupant, or pet is within the vehicle based on the sensor data. In some embodiments, the ECU uses a transceiver to communicate the sensor data to a remote data server (e.g., remote data server 436) and the remote data server determines whether the object, occupant, or pet, is within the vehicle and communicates the determination to the ECU of the vehicle. In some embodiments, a combination of the ECU and the processor (e.g., processor 438) of the remote data server are used to determine whether the object, occupant, or pet is within the vehicle based on the sensor data.

The ECU may identify the object, occupant, or pet within the vehicle, in addition to detecting the object, occupant, or pet within the vehicle, based on the sensor data (step 506). The ECU may identify the object, occupant, or pet within the vehicle at any level of specificity it is capable of. For example, the ECU may identify a pet within the vehicle as a dog or a cat, as a specific breed of dog or cat (e.g., bulldog or tabby), or a specific dog or cat (e.g., "your dog Winston" or "your cat Alexander"). The ECU may use machine learning techniques and/or artificial intelligence to identify the object, occupant, or pet within the vehicle.

The ECU may identify a location of the object, occupant, or pet within the vehicle based on the sensor data (step 508). In some embodiments, the ECU identifies the location of the object, occupant, or pet within the vehicle based on a location of the respective sensor from which the sensor data was received. For example, the presence of a smartphone may be detected using sensor data from a sensor above a rear driver's side seat. Thus, the ECU may determine that the smartphone is located on the rear driver's side seat. In some embodiments, the sensor data may identify objects in the background that are used to identify the location of the object, occupant, or pet within the vehicle. For example, the sensor data may be image data, and the image data may include a particular cupholder next to the detected object, occupant, or pet, which may be used to identify the location of the object, occupant, or pet.

The ECU provides a notification to a user of the vehicle regarding the presence of the object, occupant, or pet within the vehicle (step 510). The notification may be an audible or visual notification using a speaker or display screen of the vehicle to attract the user's attention as the user exits the vehicle. The notification may be communicated from the vehicle to a mobile device (e.g., mobile device 422) of the user using respective transceivers (e.g., transceiver 408 and transceiver 426), and the mobile device of the user presents the notification to the user.

The ECU controls one or more vehicle features in response to determining whether the object, occupant, or pet is within the vehicle (step 512). The one or more vehicle features may include at least one of an HVAC unit (e.g., HVAC unit 420), a display screen (e.g., display screen 430), or windows (e.g., windows 454).

The HVAC unit may be adjusted to emit hot or cold air or draw in and circulate fresh air. The display screen may be adjusted to display entertainment content for an occupant in the vehicle. The windows may be lowered to allow fresh air to enter the passenger cabin of the vehicle.

In some embodiments, the ECU controls the one or more vehicle features in response to receiving an instruction to do so from the mobile device of the user. For example, the user may indicate, via a graphical user interface of the mobile device, that the HVAC unit should be adjusted to provide cold air for a dog or child left in the vehicle.

The ECU may communicate with a third party in response to determining whether the object, occupant, or pet is within the vehicle (step 514). The third party may include an emergency responder (e.g., emergency responder 210) or a vehicle rental company (e.g., vehicle rental company 208). The ECU may communicate with the third party when the vehicle does not receive an indication that the user has seen the notification sent from the vehicle (e.g., a notification sent to a mobile device of the user).

In some embodiments, the process 500 begins in response to one or more actions or states of the vehicle. For example, the process 500 may begin when the vehicle is parked, or when the vehicle is locked, or when the driver of the vehicle is detected as having exited the driver's seat (e.g., using a weight sensor on the driver's seat or image sensor).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for monitoring a vehicle, comprising:
   one or more sensors configured to detect first image data corresponding to an object, occupant, or pet within the vehicle and second image data corresponding to an environment outside of the vehicle; and
   an electronic control unit (ECU) communicatively coupled to the one or more sensors and configured to:
      determine that the object, occupant, or pet is within the vehicle and that a driver of the vehicle has moved out of and away from the vehicle based on the first image data and the second image data,
      provide a notification to the driver of the vehicle regarding the object, occupant, or pet being within the vehicle without the driver of the vehicle being present within the vehicle,
      receive data indicative of a request from the driver of the vehicle to activate a first vehicle feature,
      activate the first vehicle feature based on the received request, and
      activate a second vehicle feature different from the first vehicle feature automatically based on the second image data and the activation of the first vehicle feature.

2. The system of claim 1, further comprising a speaker or a display screen, and
   wherein the notification is an audible notification or a visual notification using, respectively, the speaker or the display screen.

3. The system of claim 1, further comprising a transceiver, and
   wherein the notification is communicated, using the transceiver, from the vehicle to a mobile device of the driver configured to present the notification to the driver.

4. The system of claim 1, wherein the ECU is further configured to control one or more vehicle features in response to determining that the object, occupant, or pet is within the vehicle.

5. The system of claim 4, wherein the ECU is further configured to control the one or more vehicle features in response to receiving an instruction from a mobile device of the driver.

6. The system of claim 4, wherein the one or more vehicle features include at least one of a heating, ventilation, and air conditioning (HVAC) unit, a display screen, or windows.

7. The system of claim 1, wherein the ECU is further configured to communicate with a third party device in response to determining that the object, occupant, or pet is within the vehicle, the third party device being associated with at least one of an emergency responder or a vehicle rental company.

8. The system of claim 1, wherein the one or more sensors include at least one of a microphone configured to detect audio data, an infrared sensor configured to detect infrared data, a spatial sensor configured to detect spatial data, or a weight sensor configured to detect weight data.

9. The system of claim 1, wherein the ECU is further configured to identify a location of the object, occupant, or pet within the vehicle.

10. A vehicle, comprising:
    a first sensor configured to detect first sensor data corresponding to an object, occupant, or pet;
    a second sensor configured to detect second sensor data corresponding to an environment outside of the vehicle; and
    an electronic control unit (ECU) communicatively coupled to the first sensor and the second sensor and configured to:
       determine that the object, occupant, or pet is left within the vehicle and that a driver of the vehicle has moved out of and away from the vehicle based on the first sensor data and the second sensor data,
       provide a notification to the driver of the vehicle regarding the object, occupant, or pet having been left within the vehicle,
       receive data indicative of a request from the driver of the vehicle to activate a first vehicle feature,
       activate the first vehicle feature based on the received request, and
       activate a second vehicle feature different from the first vehicle feature automatically based on the second sensor data and the activation of the first vehicle feature, the second vehicle feature including providing an output indicating that the object, occupant, or pet left within the vehicle is being taken care of via an output device connected to the ECU.

11. The vehicle of claim 10, further comprising a speaker or a display screen, and
wherein the notification includes an audible notification or a visual notification using, respectively, the speaker or the display screen.

12. The vehicle of claim 10, further comprising a transceiver coupled to the ECU, and
wherein the ECU is further configured to communicate, by the transceiver, the notification to a mobile device of the driver configured to present the notification to the driver.

13. The vehicle of claim 10, wherein the ECU is further configured to control one or more vehicle features in response to determining whether the object, occupant, or pet is within the vehicle.

14. The vehicle of claim 13, wherein the ECU is further configured to control the one or more vehicle features in response to receiving an instruction from a mobile device of the driver.

15. The vehicle of claim 13, wherein the one or more vehicle features include at least one of a heating, ventilation, and air conditioning (HVAC) unit, a display screen, or windows.

16. The vehicle of claim 10, wherein the first sensor is at least one of an image sensor configured to detect image data, a microphone configured to detect audio data, an infrared sensor configured to detect infrared data, a spatial sensor configured to detect spatial data, or a weight sensor configured to detect weight data.

17. A method for monitoring a vehicle, the method comprising:
   detecting, by one or more sensors, first image data corresponding to an object, occupant, or pet within the vehicle and second image data corresponding to an environment outside of the vehicle;
   determining, by an electronic control unit (ECU) connected to the one or more sensors, that the object, occupant, or pet is within the vehicle and that a driver of the vehicle has moved out of and away from the vehicle based on the first image data and the second image data;
   providing, by the ECU, a notification to the driver of the vehicle regarding the object, occupant, or pet being within the vehicle without the driver of the vehicle being present within the vehicle;
   receiving, by the ECU, data indicative of a request from the driver of the vehicle to activate a vehicle feature;
   activating, by the ECU, the vehicle feature based on the received request; and
   providing, by the ECU, an output indicating that the object, occupant, or pet within the vehicle is being taken care of and to be output via an output device connected to the ECU.

18. The method of claim 17, further comprising controlling, by the ECU, one or more vehicle features in response to determining that the object, occupant, or pet is within the vehicle, the one or more vehicle features including at least one of a heating, ventilation, and air conditioning (HVAC) unit, a display screen, or windows.

19. The method of claim 17, further comprising communicating, by a transceiver connected to the ECU, with a third party device in response to determining that the object, occupant, or pet is within the vehicle, the third party device being associated with at least one of an emergency responder or a vehicle rental company.

20. The method of claim 17, further comprising:
   identifying, by the ECU, a location of the object, occupant, or pet within the vehicle.

* * * * *